US010055207B2

(12) United States Patent
Slavov (10) Patent No.: US 10,055,207 B2
(45) Date of Patent: Aug. 21, 2018

(54) PERSISTENT VARIABLES IN PROGRAMMING LANGUAGES

(71) Applicant: VMware, Inc., Palo Alto, CA (US)

(72) Inventor: Milko Slavov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 192 days.

(21) Appl. No.: 13/801,563

(22) Filed: Mar. 13, 2013

(65) Prior Publication Data

US 2014/0282447 A1 Sep. 18, 2014

(51) Int. Cl.
*G06F 9/44* (2018.01)
*G06F 8/41* (2018.01)
*G06F 9/448* (2018.01)

(52) U.S. Cl.
CPC .............. *G06F 8/41* (2013.01); *G06F 9/4493* (2018.02)

(58) Field of Classification Search
CPC .......... G06F 17/30; G06F 9/4435; G06F 8/41; G06F 9/4493
See application file for complete search history.

(56) References Cited

U.S. PATENT DOCUMENTS

| 4,445,177 | A | * | 4/1984 | Bratt | G06F 8/41 |
| | | | | | 712/245 |
| 5,450,554 | A | * | 9/1995 | Zaiki | 717/156 |
| 5,590,331 | A | * | 12/1996 | Lewis et al. | 717/144 |
| 5,687,377 | A | * | 11/1997 | Pasquariello | 717/139 |
| 5,784,553 | A | * | 7/1998 | Kolawa et al. | 714/38.1 |
| 5,815,415 | A | * | 9/1998 | Bentley | G06F 9/4493 |
| | | | | | 703/4 |
| 5,864,864 | A | * | 1/1999 | Lerner | G06F 17/30607 |
| 5,907,709 | A | * | 5/1999 | Cantey et al. | 717/141 |
| 6,075,942 | A | * | 6/2000 | Cartwright, Jr. | 717/138 |
| 6,510,551 | B1 | * | 1/2003 | Miller | 717/114 |
| 6,769,124 | B1 | * | 7/2004 | Schoening | G06F 9/4493 |
| | | | | | 719/316 |
| 7,155,433 | B2 | * | 12/2006 | Lasken | G06F 17/30864 |
| 7,496,869 | B1 | * | 2/2009 | Janneck | G06F 17/5045 |
| | | | | | 716/103 |
| 7,778,972 | B1 | * | 8/2010 | Cormie | G06F 17/30094 |
| | | | | | 707/626 |
| 8,260,818 | B1 | * | 9/2012 | Polydov | 707/796 |
| 8,756,338 | B1 | * | 6/2014 | Potakamuri | G06F 3/061 |
| | | | | | 709/202 |

(Continued)

OTHER PUBLICATIONS

Walid Taha et al., "MetaML and multi-stage programming with explicit annotations", [Online], 2000, pp. 211-242, [Retrieved from Interent on Apr. 2, 2018], <https://ac.els-cdn.com/S0304397500000530/1-s2.0-S0304397500000530-main.pdf>.*

(Continued)

*Primary Examiner* — Ziaul A Chowdhury
(74) *Attorney, Agent, or Firm* — Fish & Richardson P.C.

(57) ABSTRACT

Techniques for automatically persisting variable data are provided. In one embodiment, a computer system can identify, upon compiling or interpreting source code for an application, a variable in the source code that is declared with a predefined keyword. The predefined keyword can indicate that the variable should be persistent. The computer system can then generate, for each instance in the source code where data is assigned to the variable, runtime code for saving the data in a nonvolatile data store.

24 Claims, 6 Drawing Sheets

(56) References Cited

U.S. PATENT DOCUMENTS

| | | | | |
|---|---|---|---|---|
| 2002/0138441 A1* | 9/2002 | Lopatic | ............... | G06F 21/125 705/59 |
| 2003/0078902 A1* | 4/2003 | Leong | ............... | G06F 9/4493 706/59 |
| 2004/0158824 A1* | 8/2004 | Gennip | ............... | G06F 8/30 717/140 |
| 2004/0243284 A1* | 12/2004 | Dutta et al. | ............... | 701/1 |
| 2005/0097523 A1* | 5/2005 | Uchida | ............... | 717/136 |
| 2005/0138610 A1* | 6/2005 | Terunuma | ............... | G06F 8/41 717/140 |
| 2006/0036996 A1* | 2/2006 | Low | ............... | G06F 8/20 717/113 |
| 2006/0155710 A1* | 7/2006 | Dorsey | ............... | G06F 9/4448 |
| 2007/0033322 A1* | 2/2007 | Zimmer et al. | ............... | 711/103 |
| 2007/0055966 A1* | 3/2007 | Waddington | ............... | G06F 8/72 717/144 |
| 2007/0245323 A1* | 10/2007 | Bertelrud | ............... | G06F 8/41 717/140 |
| 2008/0313604 A1* | 12/2008 | Cowtan | ............... | G06F 8/44 717/106 |
| 2010/0131925 A1* | 5/2010 | Gutfleisch | ............... | 717/113 |
| 2010/0223601 A1* | 9/2010 | Tailor | ............... | G06F 8/41 717/139 |
| 2011/0055806 A1* | 3/2011 | Chicherin et al. | ............... | 717/106 |
| 2011/0307875 A1* | 12/2011 | Xu | ............... | G06F 8/437 717/151 |
| 2012/0327440 A1* | 12/2012 | Hata et al. | ............... | 358/1.13 |
| 2013/0007712 A1* | 1/2013 | Agarwal | ............... | G06F 11/3624 717/124 |
| 2013/0054908 A1* | 2/2013 | Gehani | ............... | G06F 9/4435 711/161 |
| 2013/0086568 A1* | 4/2013 | Krishnamurthy | ............... | G06F 9/4493 717/154 |
| 2015/0242301 A1* | 8/2015 | Ciocoi | ............... | G06F 11/3636 717/131 |

OTHER PUBLICATIONS

Antony L. Hosking et al., "Compiler Support for Persistent Programming", [Online], 1991, pp. 1-15, [Retrieved from Internet on Apr. 2, 2018], <https://www.cs.purdue.edu/homes/hosking/papers/UM-CS-1991-025.pdf>.*

Neal Sample et al., "MARS: Runtime Support for Coordinated Applications", [Online], 1998, pp. 166-174, [Retroeved from Internet on Apr. 2, 2018], <http://delivery.acm.org/10.1145/300000/298227/p166-sample.pdf>.*

* cited by examiner

PERSISTENT VARIABLES IN PROGRAMMING LANGUAGES

BACKGROUND

In computer programming, a variable is a programming language construct that comprises a symbolic identifier (i.e., a variable name) and an associated storage location. Developers can use the symbolic identifier as a handle to store data to, and retrieve data from, the storage location. By way of example, within the source code for an application, a developer can declare a variable having the name "employeeID" and data type "integer." The developer can further assign an integer value to the variable (e.g., "1000") using an appropriate assignment statement that references variable name "employeeID." The developer can then compile the source code (via a compiler) into executable, or runtime, code. At runtime of the application, the runtime code can allocate, within a memory component of the machine executing the application, a storage location for the variable "employeeID" that is suitable for storing integer values. The runtime code can then store the value "1000" in the allocated storage location upon encountering the assignment of "1000" to "employeeID."

Generally speaking, conventional compilers generate runtime code that stores variable data entirely in the working, volatile memory (e.g., RAM) of the executing machine. Although this approach ensures that variables can be accessed quickly, it also imposes a limit on the maximum size of the variables—namely, the amount of free space available in the machine's volatile memory pool. This limit can be problematic if the application needs to store and retrieve variable data that is very large, such as maps, arrays, and other complex data structures. Developers can circumvent this limitation to an extent by implementing code for manually persisting such data to a backend storage device (via, e.g., a file system or database application programming interface (API)). However, this workaround can significantly increase the complexity the application.

SUMMARY

Techniques for automatically persisting variable data are provided. In one embodiment, a computer system can identify, upon compiling or interpreting source code for an application, a variable in the source code that is declared with a predefined keyword. The predefined keyword can indicate that the variable should be persistent. The computer system can then generate, for each instance in the source code where data is assigned to the variable, runtime code for saving the data in a nonvolatile data store.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Particular embodiments provide a framework for implementing "persistent variables" in programming languages. As used herein, a "persistent variable" is a variable whose associated data (e.g., value) is automatically saved to, and automatically retrieved from, a nonvolatile data store rather than the volatile memory of an executing machine. In one embodiment, at compile-time of an application, a compiler can parse the source code for the application and identify a variable in the source code that the application developer has declared with a predefined keyword. The predefined keyword can indicate that the variable should be persistent. The compiler can then generate, (1) for each instance in the source code where data is assigned to the variable, runtime code for automatically saving the data to the nonvolatile data store, and (2) for each instance in the source code where the variable is accessed, runtime code for automatically retrieving the variable data from the nonvolatile data store. At a later point in time, when a machine executes the runtime code for the application, the runtime code can access the nonvolatile data store to store and/or retrieve the variable data accordingly.

In an alternative embodiment, the steps described above can be performed entirely by a runtime interpreter (in the case that the programming language is a single-pass interpreted language).

With the framework above, variable sizes are no longer limited by the amount of available RAM in an executing machine, which is typically on the order of gigabytes; instead, a single variable can hold terabytes of data or more. Further, developers do not need to manually invoke file system APIs or implement other complex mechanisms to scale out variable data; rather, they can simply declare a variable using the predefined keyword, and the compiler/interpreter can automatically handle the task of generating code for writing out, and reading in, data for the variable to/from a nonvolatile data store at runtime.

In certain embodiments, the nonvolatile data store that is used to store variable data can be a distributed storage system, such as a distributed database. In these embodiments, data for a variable may be stored across multiple nodes of the distributed storage system for scalability and/or to meet certain Quality-of-Service (QoS) performance guarantees. In one embodiment, variable data can be automatically replicated between the nodes of the distributed storage system (or to another storage system) to ensure data redundancy in the case of a storage system failure.

Figure 1:
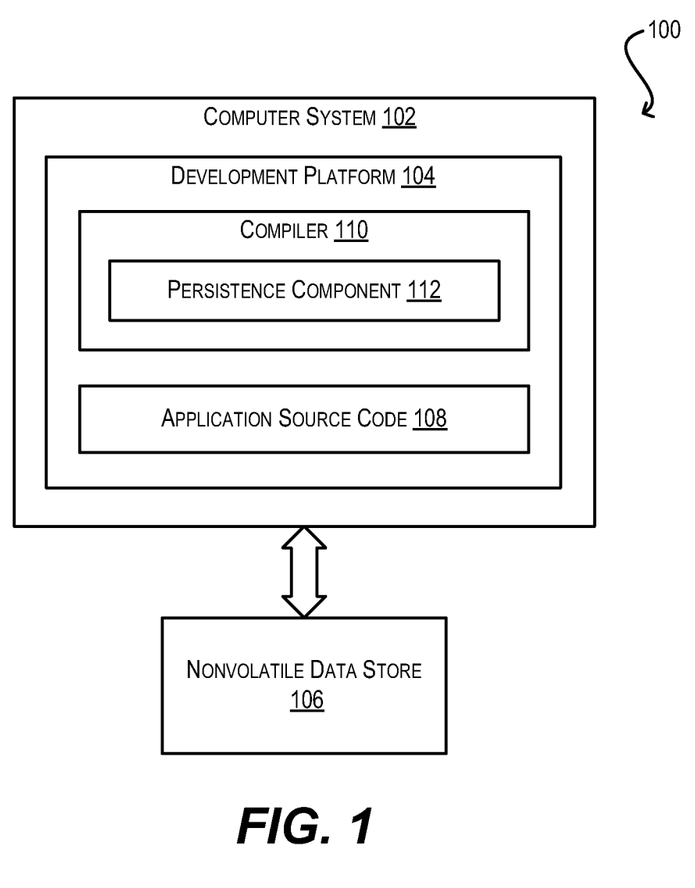
FIG. 1 depicts a block diagram of a compile-time environment that supports persistent variables according to one embodiment.

FIG. 1 depicts a compile-time environment 100 that supports persistent variables according to an embodiment. Compile-time environment 100 includes a computer system 102 that is configured to run a development platform 104. Development platform 104 can be any type of software known in the art that provides facilities for developing (e.g., authoring, compiling, deploying) software applications. In a particular embodiment, development platform 104 can correspond to one of a number of commercially available integrated development environments (IDEs), such as Eclipse, Oracle JDeveloper, Microsoft Visual Studio, and so on.

Compile-time environment 100 also includes a nonvolatile data store 106 that is communicatively coupled with computer system 102. Nonvolatile data store 106 can be, e.g., a database or any other type of structured or unstructured data repository that is backed by a nonvolatile (i.e., persistent) storage medium, such as a hard disk or hard disk-based array, a flash storage device, or the like.

In a typical operational flow, a user of development platform 104 can enter, via a code or text editor (not shown), source code for an application in development (i.e., application source code 108). Application source code 108 can be expressed in any programming language supported by development platform 104 and can include, e.g., one or more variables that are used by the application. The user can then compile application source code 108 via a compiler 110 in order to generate an executable version of the application. As part of this compilation process, compiler 110 can generate runtime code (either byte code or native machine code) that allocates a storage location for each variable and stores data to/retrieves data from its allocated storage location as dictated by application source code 108.

As noted in the Background section, conventional compilers generally allocate storage locations for variables in the volatile memory (e.g., RAM) of the machine executing the application. This means that such variables cannot hold (i.e., be assigned) more data than the amount of space available in the machine's volatile memory pool, which is typically not very large. This limitation, in turn, requires developers to manually implement data persistence code (via, e.g., file system or database APIs) in order to handle large-scale data structures.

To address this issue, compiler 110 can include a persistence component 112. In various embodiments, persistence component 112 can, upon compiling application source code 108, automatically generate runtime code for persisting the data for certain variables to nonvolatile data store 106. With this functionality, developers can declare and manipulate variables that hold very large amounts of data (e.g., on the order of gigabytes, terabytes, or more) without requiring significant developer intervention/programming.

Figure 2:
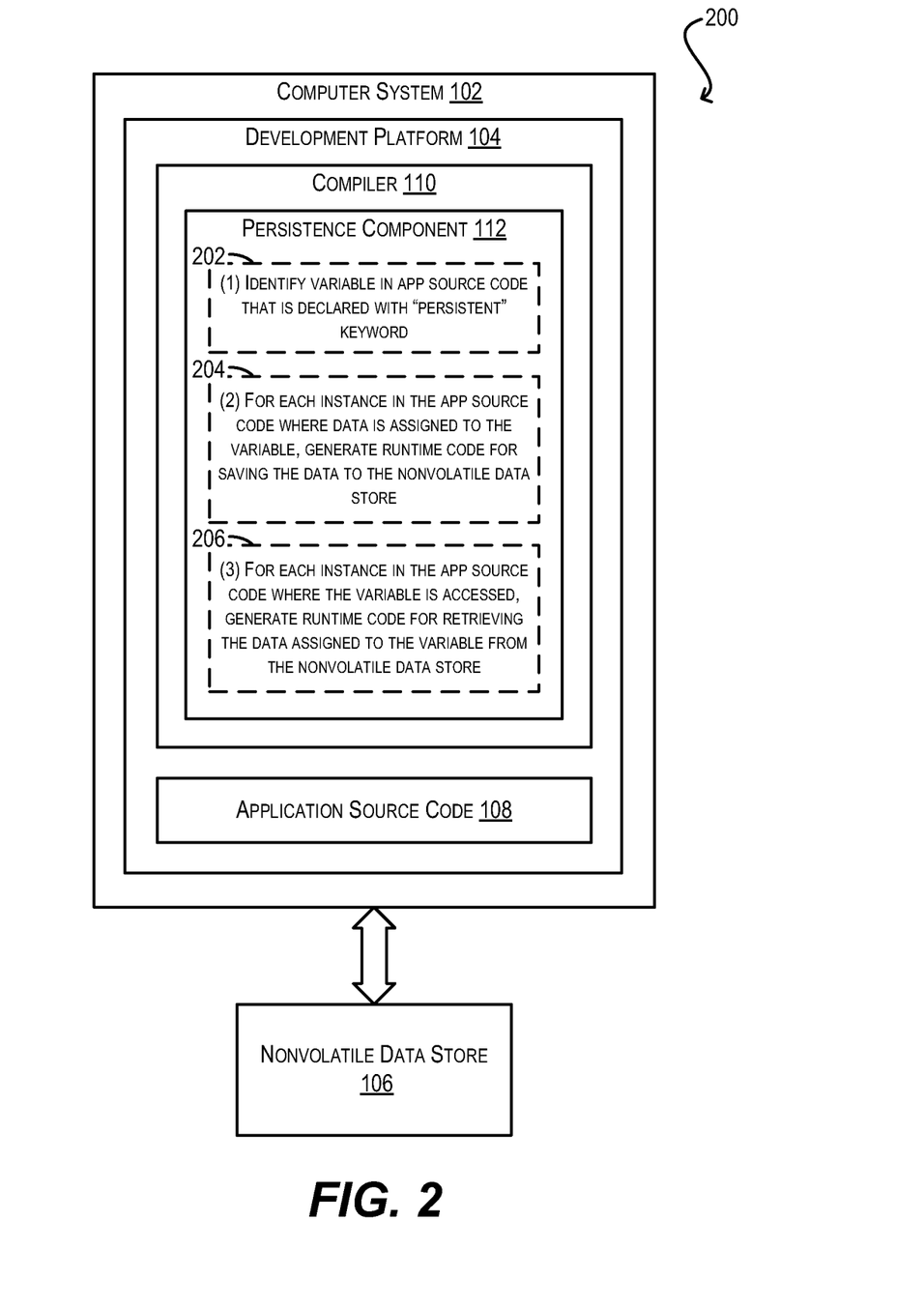
FIG. 2 depicts a flow within the compile-time environment of FIG. 1 for generating runtime code according to one embodiment.

FIG. 2 depicts a flow 200 that can be performed by persistence component 112 of compiler 110 for enabling persistent variables according to an embodiment. In one embodiment, flow 200 can be initiated by compiler 110 at the time of compiling application source code 108.

At step (1) of flow 200 (reference numeral 202), persistence component 112 can identify a variable in application source code 108 that the application developer has declared with a predefined keyword (e.g., "persistent"). The predefined keyword can indicate that the data for the variable should be automatically persisted to a nonvolatile data store such as data store 106 (rather than the volatile memory of an executing machine) at application runtime. By way of example, the following is a Java statement for declaring an integer array variable "myArray" using the predefined keyword "persistent":
persistent int[ ] myArray;

Alternatively, the predefined keyword can be included in the source code as an "annotation," which is a form of syntactic metadata that is supported by several programming languages. The following Java statement declares a "myString" variable with the predefined "persistent" keyword identified in a Java annotation:
@persistent String myString;

In certain embodiments, the predefined keyword may be applied to variables having either a language-defined data type (e.g., int, string, boolean, array, map, etc.) or a user-defined data type (e.g., a user-defined class). In alternative embodiments, the predefined keyword may be applied solely to variables having a language-defined data type.

In further embodiments, a variable may be declared with additional keywords/annotations (other than the "persistent" keyword) that provide additional contextual information regarding the variable to persistence component 112. For example, a variable may be declared with a keyword that identifies a service level agreement (SLA) for storing/retrieving data for the variable to/from nonvolatile data store 106. For a distributed data store, the SLA may specify the availability of the data, location, etc. Other types of keywords are also contemplated and within the scope of the embodiments herein.

Once a variable declaration with the predefined keyword is identified, persistence component 112 can automatically generate runtime code for saving and/or retrieving data associated with the variable at each point where the variable appears in application source code 108. For example, at step (2) (reference numeral 204), persistence component 112 can, for each instance in application source code 108 where data is assigned to the variable, generate runtime code for saving the data to nonvolatile data store 106. Further, at step (3) (reference numeral 206), persistence component 112 can, for each instance in application source code 108 where the variable is accessed, generate runtime code for retrieving the variable data from nonvolatile data store 106.

Figure 6:
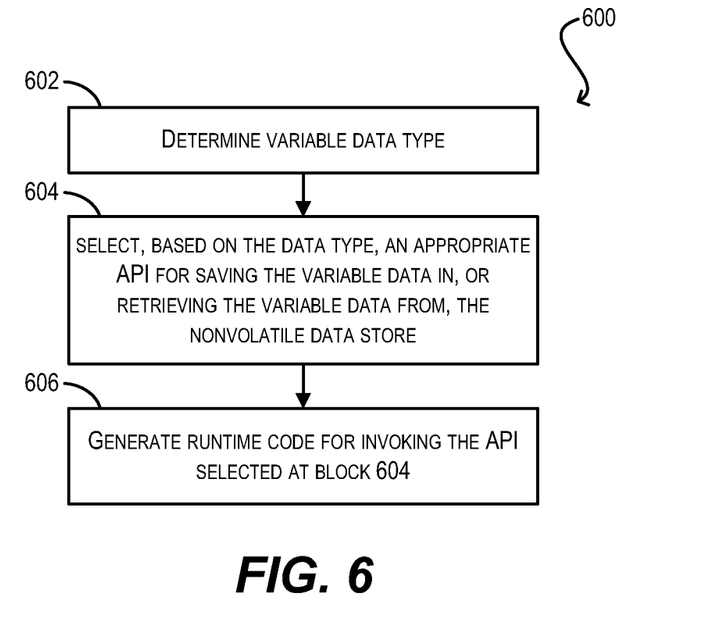
FIG. 6 depicts a flowchart that provides additional details regarding the flow of FIG. 2 according to one embodiment.

In certain embodiments, the processing at steps (2) and (3) can include the sub-steps of selecting, based on the data type of the variable, one of a plurality of persistence APIs exposed by nonvolatile data store 106 (e.g., store_string, store_array[ ], etc.) and generating runtime code for invoking the selected persistence API; these embodiments are described in further detail with respect to FIG. 6 below. In a particular embodiment, the specific persistence API that persistence component 112 selects can be based on, e.g., an additional predefined keyword or annotation that is associated with the variable at the time of declaration.

At the conclusion of process 200, compiler 110 can output an executable file for the application (either native machine code or byte code) that includes the runtime code generated by persistence component 112 at steps (2) and (3). Computer system 102 (or some other machine) can subsequently invoke the executable file at application runtime, thereby causing the embedded runtime code to interact with nonvolatile data store 106 to store and/or retrieve data for the variable in a persistent manner.

Figure 3:
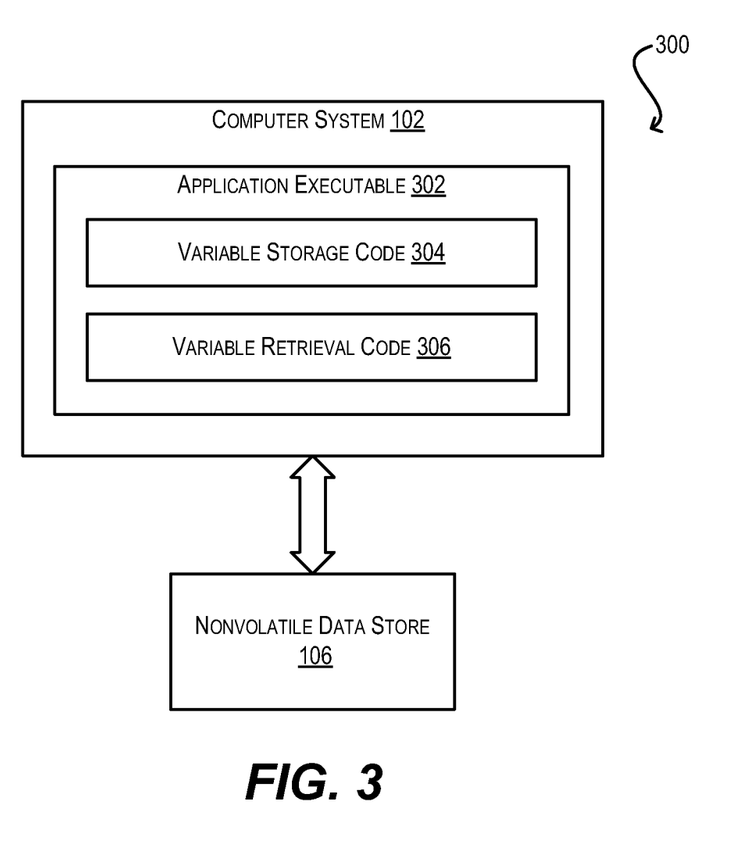
FIG. 3 depicts a block diagram of a runtime environment that supports persistent variables according to one embodiment.

FIG. 3 depicts a runtime environment 300 for executing the runtime code generated via flow 200 of FIG. 2 according to an embodiment. As shown, runtime environment 300 includes the same computer system 102 and nonvolatile data store 106 as FIG. 2 (although any other computer system and/or nonvolatile data store may be used in the runtime environment). In addition, computer system 102 includes an application executable 302 comprising variable storage code 304 and variable retrieval code 306. Application executable 302 can correspond to the executable file output by compiler 110 at the end of flow 200, while variable storage code 304 and variable retrieval code 306 can correspond to the runtime code generated by persistence component 112 at steps (2) and (3) of flow 200 respectively.

Although not shown in FIG. 3, in certain embodiments computer system 102 can also include a software interpreter (such as a Java Virtual Machine or JVM) for assisting with the execution of application executable 302 (in cases where, e.g., application executable 302 includes machine-independent byte code).

Figure 4:
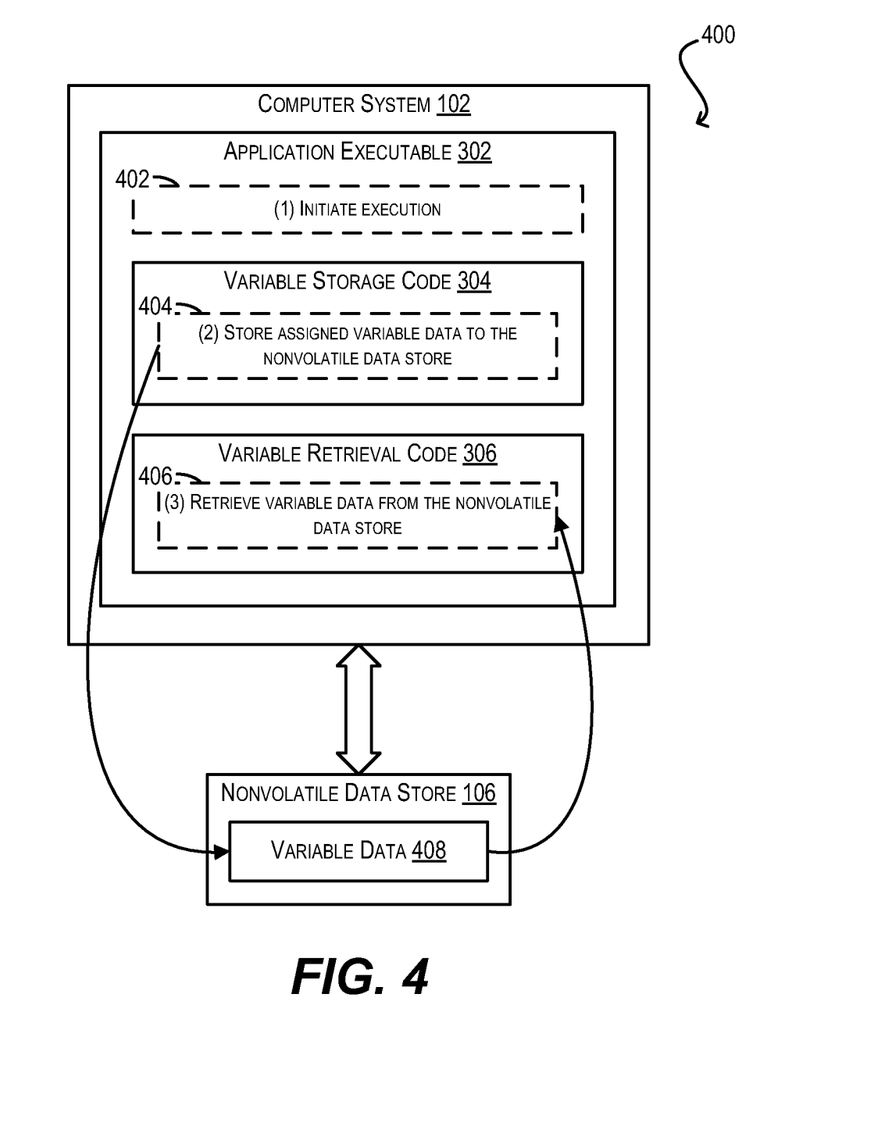
FIG. 4 depicts a flow within the runtime environment of FIG. 3 for executing the runtime code generated in FIG. 2 according to one embodiment.

FIG. 4 depicts a flow 400 that can be performed by application executable 302 at application runtime according to an embodiment. In particular, flow 400 illustrates steps that enable application executable 302 to interact with nonvolatile data store 106 in order to persist variable data.

At step (1) of flow 400 (reference numeral 402), application executable 302 can begin execution. At step (2) of flow 400 (reference numeral 404), application executable 302 can invoke variable storage code 304 for storing data assigned to a persistent variable. In response, variable storage code 304 can save the variable data in nonvolatile data store 106 (as, e.g., variable data 408). In certain embodiments, this saving process can comprise invoking a persistence API that was selected by persistence component 112 as part of compile-time flow 200.

At step (3) (reference numeral 406), application executable 302 can invoke variable retrieval code 306 for retrieving the data previously assigned to the persistent variable at step (2). In response, variable retrieval code 306 can retrieve variable data 408 from nonvolatile data store 106. Application executable 302 can then use retrieved variable data 408 as needed to continue program execution. Like step (2), this retrieval process can comprise invoking a persistence API that was selected by persistence component 112 as part of compile-time flow 200.

Steps (1) and (2) of flow 400 can subsequently repeat any number of times (as dictated by the original structure of application source code 108) to persist variable data to, and retrieve variable data from, nonvolatile data store 106. Flow 400 can end when application executable 302 reaches the end of its processing workflow or is terminated.

With the variable persistence framework shown in FIGS. 1-4, variables are no longer limited in size to the available volatile memory space of computer system 102; variables can automatically scale out to any size supported by nonvolatile data store 106. In addition, developers can enable this functionality by simply declaring variables using the predefined keyword noted with respect to step (1) of flow 200; persistence component 112 can thereafter handle the task of generating the runtime code needed to implement variable persistence, without any further developer intervention or coding. This significantly simplifies application development.

Although not shown in the preceding figures, in certain embodiments persistence component 112 can reside in a runtime interpreter (rather than compiler 110). This may be the case if, e.g., application source code 108 is written in a single-pass interpreted language (such as Ruby). In these embodiments, the runtime interpreter can perform, at application runtime, the steps attributed to persistence component 112 in FIG. 2 for enabling the application to save variable data to, and retrieve variable data from, nonvolatile data store 106.

Figure 5:
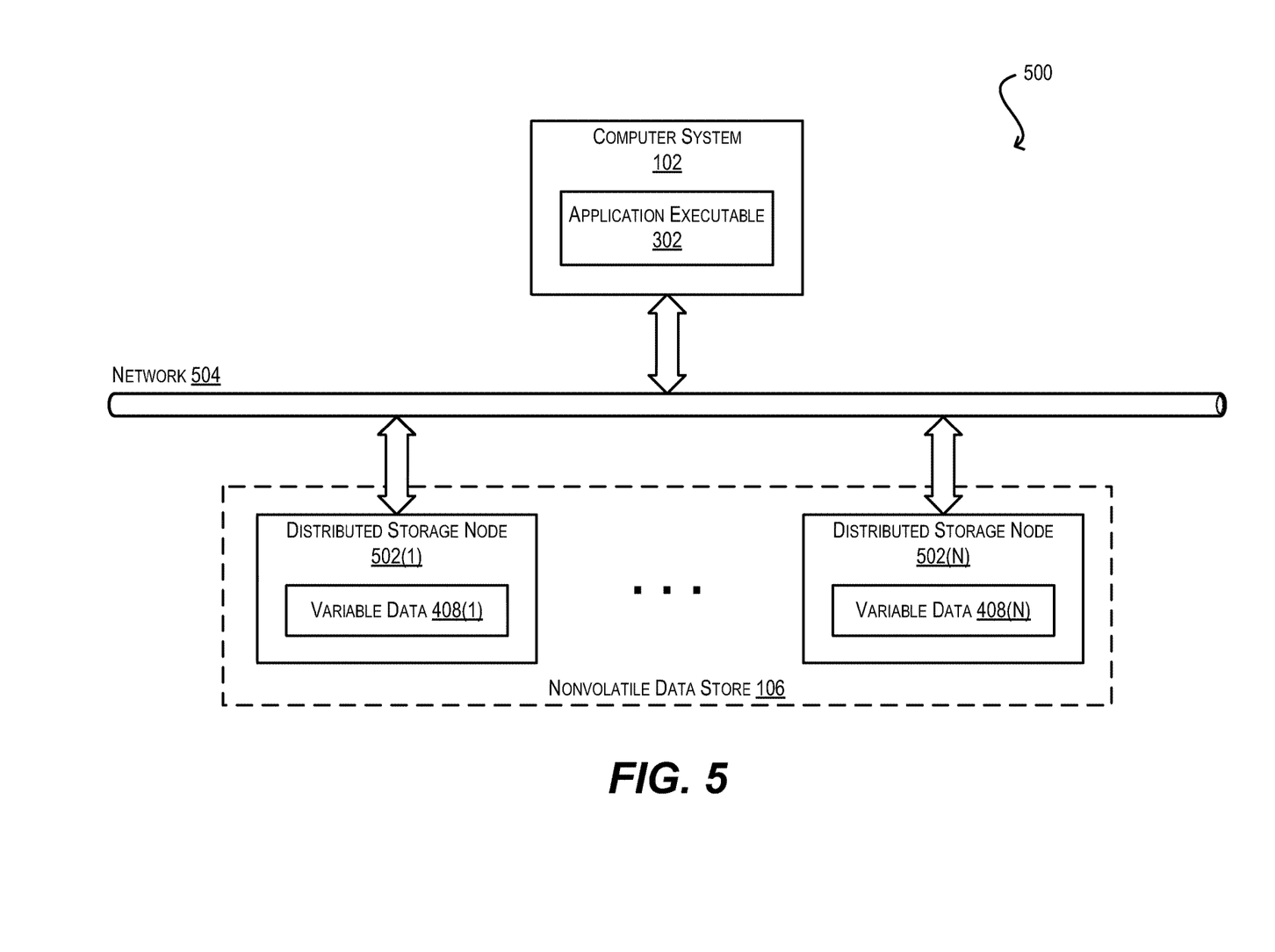
FIG. 5 depicts a block diagram of a runtime environment that includes a distributed storage system according to one embodiment.

In a particular embodiment, nonvolatile data store 106 can be implemented as a distributed storage system that includes a number of distinct storage nodes, such as a distributed database. For instance, FIG. 5 depicts an alternative version of runtime environment 300 (runtime environment 500) in which nonvolatile data store 106 is a distributed storage system that includes distributed storage nodes 502(1)-502(N). Distributed storage nodes 502(1)-502(N) are connected to computer system 102 (running application executable 302) via an appropriate network 504.

In the embodiment of FIG. 5, nonvolatile data store 106 can implement certain policies that provide additional benefits to applications that utilize the variable persistence framework of FIGS. 1-4. For example, nonvolatile data store 106 can partition variable data across distributed storage nodes 502(1)-502(N) (shown as variable data 408(1)-408(N)) as needed to support arbitrarily large variable sizes, as well as maintain minimum levels of service quality (e.g., latency, bandwidth, etc.) when servicing I/O requests from computer system 102. As another example, nonvolatile data store 106 can replicate variable data between distributed storage nodes 502(1)-502(N), or to a completely different data storage system, to ensure data redundancy in the face of storage system failures. Since all of these policies can be configured at the storage system level (rather than the application level), applications that persist variable data to nonvolatile data store 106 can automatically reap these benefits without any developer coding or configuration, which further simplifies application development.

As noted with respect steps (2) and (3) of flow 200, in certain embodiments the acts of generating, at compile-time, variable storage code 304 and variable retrieval code 306 for a particular persistent variable can involve mapping the variable to one of a number of different persistence APIs that are exposed by nonvolatile data store 106. FIG. 6 depicts a flowchart 600 that explains this process in further detail.

At block 602, persistence component 112 can determine a data type for a variable that has been declared via the predefined "persistent" keyword per step (1) of flow 200. For example, persistent component 112 can determine that the variable is a primitive data type such as an integer, string, etc., or a complex data type such as an array, map, user-defined class, etc.

At block 604, persistence component 112 can select, based on the variable data type, a persistence API (among a plurality of persistent APIs exposed by nonvolatile data store 106) for saving data for the variable to, or retrieving data for the variable from, nonvolatile data store 106. For instance, assume nonvolatile data store 106 exposes a first API for storing an integer value, a second API for storing a string value, and a third API for storing one or more elements in an array. In this case, persistence API can select the first API for storing an assigned variable value if the variable data type is integer, the second API if the variable data type is string, and the third API if the variable data type is array.

In situations where the variable has a complex data type (and thus includes a set of values), the persistence API selected at block 604 can take into account the number of values that are being assigned or accessed. For example, if the application only needs to access a single element from an array variable at step (3) of flow 200, persistence component 112 can select a persistence API that is configured to retrieve a single array element (rather than the entire array). This functionality can significantly improve runtime performance when very large variables are used, since the application can avoid storing or retrieving more variable data that it needs from nonvolatile data store 106 for a given variable assignment or access statement.

It should be appreciated that the specific persistence APIs available for selection at block 604 will differ based on the type or storage representation of nonvolatile data store 106.

For instance, if nonvolatile data store 106 is a key-value store, nonvolatile data store 106 may only expose generic GET and PUT APIs that apply to a number of variable data types. On the other hand, if nonvolatile data store 106 is a relational database, nonvolatile data store 106 may expose more granular APIs that are specific to particular data types and data structures. In one embodiment, persistence component 112 can be configured to identify the type of nonvolatile data store 106 and modify the selection logic at block 604 appropriately.

Finally, at block 606, persistence component 112 can generate runtime code for invoking the persistence API selected at block 604. In certain embodiments, each of the persistence APIs exposed by nonvolatile data store 106 can take, as input parameters, the name of the variable, a type of scope, and a scope identifier for the variable (assigned either at compile time or runtime). When invoked, the persistence APIs can then use these input parameters to generate a unique key or index for storing/retrieving the variable data to/from nonvolatile data store 106.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments may be useful machine operations. In addition, one or more embodiments may also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including handheld devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Disc)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

Many variations, modifications, additions, and improvements to the techniques described are possible. For example, plural instances may be provided for components, operations or structures that are described as a single instance. In addition, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments. Based on the above disclosure and the following claims, other arrangements, embodiments, implementations and equivalents may be employed without departing from the scope hereof as defined by the claims.

What is claimed is:

1. A computer implemented method for automatically persisting variable data, the method being performed by a computer system, comprising a compiler, at a time of compiling source code for an application, the method comprising:

at compile time, using the compiler to perform operations comprising:

prior to compiling the source code of the application into an executable file, identifying, by the computer system, a variable in the source code of the application that is declared with a predefined keyword, the predefined keyword indicating that the variable in the source code of the application should be persistent; and generating the executable file for the application from the source code, wherein generating the executable file comprises:

compiling the source code for the application into runtime code for executing the application, wherein compiling the source code for the application includes generating, by the compiler and in response to the identified variable, particular runtime code for the source code of the application for each instance in the source code where the corresponding identified variable occurs, wherein the generated particular runtime code, distinct from the runtime code of the application, is incorporated into the executable file for the application and is configured to provide the persistence of the variable of the application, and wherein execution of the runtime code for the application that provides the persistence during execution of the executable file saves data assigned to the variable in a nonvolatile data store, and outputting the executable file for the application that includes the generated runtime code.

2. The method of claim 1 wherein generating the runtime code for saving the data in the nonvolatile data store comprises:
   determining a data type of the variable;
   selecting, from among a plurality of application programming interfaces (APIs) associated with the nonvolatile data store, an API for saving the data in the nonvolatile data store, the selecting being based on the determined data type; and
   generating runtime code for invoking the API.

3. The method of claim 2 wherein invoking the API comprises passing a variable name and a scope identifier associated with the variable to the API, and
   wherein the API is configured to convert the variable name and the scope identifier into a key for indexing the data in the nonvolatile data store.

4. The method of claim 2 further comprising:
   generating runtime code for the application that, when executed, retrieves the data assigned to the variable from the nonvolatile data store each time the variable is accessed during runtime.

5. The method of claim 4 wherein the variable has a complex data type that defines a plurality of values, and
   wherein the runtime code for retrieving the data assigned to the variable is configured to retrieve a subset of the plurality of values.

6. The method of claim 1 wherein the variable has a predefined data type or a user-defined data type.

7. The method of claim 1 wherein the nonvolatile data store is a distributed storage system,
   wherein the distributed storage system is configured to store the data assigned to the variable across a plurality of distributed storage nodes, and
   wherein the distributed storage system is configured to replicate the data assigned to the variable across a plurality of distributed storage nodes.

8. The method of claim 1 wherein the computer system generates the runtime code for saving the data in the nonvolatile data store without generating any runtime code for allocating a storage location for the data in the computer system's volatile memory.

9. A non-transitory computer readable storage medium having stored thereon computer software executable by a processor, the computer software embodying a method for automatically persisting variable data, the method being performed by a computer system, comprising a complier, at a time of compiling source code for an application, the method comprising:
   at compile time, using the compiler to perform operations comprising:
      prior to compiling the source code of the application into an executable file, identifying a variable in the source code of the application that is declared with a predefined keyword, the predefined keyword indicating that the variable in the source code of the application should be persistent; and
      generating the executable file for the application from the source code, wherein generating the executable file comprises:
         compiling the source code for the application into runtime code for executing the application, wherein compiling the source code for the application includes generating, in response to the identified variable, particular runtime code for the source code of the application for each instance in the source code where the corresponding identified variable occurs, wherein the generated particular runtime code, distinct from the runtime code of the application, is incorporated into the executable file for the application and is configured to provide the persistence of the variable of the application, and wherein execution of the runtime code for the application that provides the persistence during execution of the executable file saves data assigned to the variable in a nonvolatile data store, and
         outputting the executable file for the application that includes the generated runtime code.

10. The non-transitory computer readable storage medium of claim 9 wherein generating the runtime code for saving the data in the nonvolatile data store comprises:
    determining a data type of the variable;
    selecting, from among a plurality of APIs associated with the nonvolatile data store, an API for saving the data in the nonvolatile data store, the selecting being based on the determined data type; and
    generating runtime code for invoking the API.

11. The non-transitory computer readable storage medium of claim 10 wherein invoking the API comprises passing a variable name and a scope identifier associated with the variable to the API, and
    wherein the API is configured to convert the variable name and the scope identifier into a key for indexing the data in the nonvolatile data store.

12. The non-transitory computer readable storage medium of claim 10 wherein the method further comprises:
    generating runtime code for the application that, when executed, retrieves the data assigned to the variable from the nonvolatile data store each time the variable is accessed during runtime.

13. The non-transitory computer readable storage medium of claim 12 wherein the variable has a complex data type that defines a plurality of values, and
    wherein the runtime code for retrieving the data assigned to the variable is configured to retrieve a subset of the plurality of values.

14. The non-transitory computer readable storage medium of claim 9 wherein the variable has a predefined data type or a user-defined data type.

15. The non-transitory computer readable storage medium of claim 9 wherein the nonvolatile data store is a distributed storage system,
    wherein the distributed storage system is configured to store the data assigned to the variable across a plurality of distributed storage nodes, and
    wherein the distributed storage system is configured to replicate the data assigned to the variable across a plurality of distributed storage nodes.

16. The non-transitory computer readable storage medium of claim 9 wherein the processor generates the runtime code for saving the data in the nonvolatile data store without generating any runtime code for allocating a storage location for the data in the computer system's volatile memory.

17. A system comprising:
    a processor; and
    a memory having stored thereon instructions which, when executed by the processor, cause the processor to, at a time of compiling source code for an application:
       at compile time, using a compiler to perform operations comprising:
          prior to compiling the source code of the application into an executable file, identify a variable in the source code of the application that is declared with a predefined keyword, the predefined keyword indicating that the variable in the source code of the application should be persistent; and generate the executable file for the application from the source code, wherein generating the executable file comprises:

compiling the source code for the application into runtime code for executing the application, wherein compiling the source code for the application includes generating, in response to the identified variable, particular runtime code for the source code of the application for each instance in the source code where the corresponding identified variable occurs, wherein the generated particular runtime code, distinct from the runtime code of the application, is incorporated into the executable file for the application and is configured to provide the persistence of the variable of the application, and wherein execution of the runtime code for the application that provides the persistence during execution of the executable file saves data assigned to the variable in a nonvolatile data store, and outputting the executable file for the application that includes the generated runtime code.

18. The system of claim 17 wherein generating the runtime code for saving the data in the nonvolatile data store comprises:

determining a data type of the variable;

selecting, from among a plurality of APIs associated with the nonvolatile data store, an API for saving the data in the nonvolatile data store, the selecting being based on the determined data type; and generating runtime code for invoking the API.

19. The system of claim 18 wherein invoking the API comprises passing a variable name and a scope identifier associated with the variable to the API, and wherein the API is configured to convert the variable name and the scope identifier into a key for indexing the data in the nonvolatile data store.

20. The system of claim 18 wherein the instructions further cause the processor to:

generate runtime code for the application that, when executed, retrieves the data assigned to the variable from the nonvolatile data store each time the variable is accessed during runtime.

21. The system of claim 20 wherein the variable has a complex data type that defines a plurality of values, and wherein the runtime code for retrieving the data assigned to the variable is configured to retrieve a subset of the plurality of values.

22. The system of claim 17 wherein the variable has a predefined data type or a user-defined data type.

23. The system of claim 17 wherein the nonvolatile data store is a distributed storage system, wherein the distributed storage system is configured to store the data assigned to the variable across a plurality of distributed storage nodes, and wherein the distributed storage system is configured to replicate the data assigned to the variable across a plurality of distributed storage nodes.

24. The system of claim 17 wherein the processor generates the runtime code for saving the data in the nonvolatile data store without generating any runtime code for allocating a storage location for the data in the computer system's volatile memory.

* * * * *